US012214525B2

(12) United States Patent
You

(10) Patent No.: US 12,214,525 B2
(45) Date of Patent: Feb. 4, 2025

(54) WORKTABLE ASSEMBLY FOR TILE CUTTER

(71) Applicant: REXON INDUSTRIAL CORP., LTD., Taichung (TW)

(72) Inventor: Wan Jie You, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 395 days.

(21) Appl. No.: 17/561,139

(22) Filed: Dec. 23, 2021

(65) Prior Publication Data

US 2022/0193952 A1 Jun. 23, 2022

(30) Foreign Application Priority Data

Dec. 23, 2020 (TW) ................................ 109145781

(51) Int. Cl.

*B28D 1/04* (2006.01)
*B28D 7/04* (2006.01)
*B28D 7/02* (2006.01)

(52) U.S. Cl.

CPC ............... *B28D 1/047* (2013.01); *B28D 7/04* (2013.01); *B28D 7/02* (2013.01)

(58) Field of Classification Search

CPC .. B28D 1/047; B28D 7/02; B28D 7/04; B27B 5/16; B23D 47/025
USPC .......................................... 125/35; 144/286.1
See application file for complete search history.

(56) References Cited

U.S. PATENT DOCUMENTS

| | | | | |
|---|---|---|---|---|
| 7,406,962 B1 * | 8/2008 | Chen | B28D 7/04 | 125/35 |
| 8,011,399 B2 * | 9/2011 | Chang | B25H 1/14 | 144/286.5 |
| 8,607,775 B2 * | 12/2013 | Cao | B28D 1/047 | 125/13.01 |
| 8,656,902 B2 * | 2/2014 | Wei | B28D 7/04 | 125/35 |
| 9,833,929 B2 * | 12/2017 | Chen | B28D 7/04 | |
| 9,962,858 B2 * | 5/2018 | Chang | B28D 7/04 | |
| 10,857,604 B2 * | 12/2020 | Lee | B23D 59/02 | |
| 11,040,464 B2 * | 6/2021 | La Banco | B23D 47/025 | |
| 11,351,640 B2 * | 6/2022 | Chen | B26D 1/18 | |
| 11,498,243 B2 * | 11/2022 | Winterfjord | B28D 1/047 | |

(Continued)

FOREIGN PATENT DOCUMENTS

| | | |
|---|---|---|
| CN | 102407569 A * | 4/2012 |
| DE | 202022100204 U1 * | 5/2022 |

(Continued)

*Primary Examiner* — Laura M Lee
(74) *Attorney, Agent, or Firm* — BACON & THOMAS, PLLC

(57) ABSTRACT

A worktable assembly for tile cutter includes a first table having a first surface and a slot recessed on the first surface and extending along a processing axis, and a second table installed in the first table and including a main body and an insertion member protruding from the main body along the processing axis and extending into the slot and having an insertion surface flush with the first surface. The second table can move relative to the first table along the processing axis, so that the main body is close to or far from the first table. The present invention provides better support through the cooperation of the slot and the insertion member and helps prevent the tile from breaking during processing.

9 Claims, 9 Drawing Sheets

(56) References Cited

U.S. PATENT DOCUMENTS

| | | | | |
|---|---|---|---|---|
| 11,584,039 | B2 * | 2/2023 | Lee | B23D 47/025 |
| 11,958,213 | B2 * | 4/2024 | Costanzo | B24B 27/065 |
| 2005/0217446 | A1 * | 10/2005 | Brazell | B25H 1/14<br>144/287 |
| 2014/0352680 | A1 * | 12/2014 | Chen | B28D 7/043<br>125/35 |
| 2015/0013659 | A1 * | 1/2015 | Chen | B28D 1/047<br>125/13.01 |
| 2020/0180185 | A1 * | 6/2020 | Costanzo | B27B 27/08 |
| 2022/0193952 | A1 * | 6/2022 | You | B28D 7/04 |
| 2022/0193953 | A1 * | 6/2022 | You | B28D 7/02 |
| 2022/0347885 | A1 * | 11/2022 | Lin | B28D 7/02 |
| 2024/0066756 | A1 * | 2/2024 | Tokubi | B28D 7/02 |
| 2024/0075653 | A1 * | 3/2024 | Chaikowsky | B28D 1/047 |

FOREIGN PATENT DOCUMENTS

| | | | | | |
|---|---|---|---|---|---|
| TW | 1438071 | B | * | 5/2014 | B28D 1/02 |
| TW | 201733761 | A | * | 10/2017 | B28D 7/02 |
| WO | WO-2018001094 | A1 | * | 1/2018 | B23Q 11/10 |
| WO | WO-2021171278 | A1 | * | 9/2021 | B23D 45/02 |

* cited by examiner

WORKTABLE ASSEMBLY FOR TILE CUTTER

BACKGROUND OF THE INVENTION

1. Field of the Invention

The present invention relates to tile cutting machines, in particular to a worktable assembly for tile cutter.

2. Description of the Related Art

An existing tile cutter comprises a base, a cutting unit, and a worktable. The cutting unit comprises an arm connected to the base, and a saw blade rotatably arranged on the arm and spaced from the base. The worktable is slidably arranged on the base along a processing axis X and can pass between the saw blade and the base. The worktable comprises a first table body 91 and a second table body 92 that can approach or be separated away from the first table body 91 along the processing axis X. When the user wants to cut a tile 93, he will first place the tile 93 on the worktable, and then push the worktable between the saw blade and the base, so that the tile 93 will be cut by the saw blade. If the original tile 93 has a large area, the tile 93 may partially extend beyond the worktable edge (as shown in FIG. 1). in this event, the user can move the second table body 92 to a position separated away from the first table body 91, so that the worktable as a whole presents an expanded state with a larger area (as shown in FIG. 2). In this way, the tile 93 can be simultaneously supported by the first table body 91 and the second table body 92 without being suspended outside the worktable.

However, when the second table body 92 is moved to a position away from the first table body 91, an empty area 94 that cannot support the tile 93 will be formed between the first table body 91 and the second table body 92. When cutting the elongated tile 93 placed along the processing axis X, it is easy to cause the tile 93 to break at the aforementioned empty area 94, resulting in processing failure.

SUMMARY OF THE INVENTION

The present invention has been accomplished under the circumstances in view. It is the main object of the present to provide a worktable assembly for tile cutter that provides better support.

Therefore, the worktable assembly for tile cutter of the present invention is suitable for installation in a tile cutter. The tile cutter comprises a base and a cutting unit set in the base. The cutting unit has an arm connected to the base, and a saw blade rotatably arranged on the arm and spaced from the base. The worktable assembly is slidably arranged on the base along a processing axis and can pass between the saw blade and the base. The worktable assembly comprises a first table and a second table.

The first table comprises a first surface facing the side where the saw blade is provided, and a slot recessed on the first surface. The slot extends along the processing axis and corresponds to the saw blade.

The second table is installed in the first table, and comprises a main body and an insertion member protruding from the main body along the processing axis and extending into the slot. The insertion member comprises an insertion surface facing the side where the saw blade is provided. The insertion surface is flush with the first surface. The second table can move between a retracted position and an expanded position along the processing axis relative to the first table. In the retracted position, the main body is adjacent to the first table and most or all of the insertion member is located in the slot. In the expanded position, the main body is separated away from the first table and only a small part of the insertion member is located in the slot or out of the slot.

The effect of the present invention is: With the cooperation of the slot and the insertion member, the insertion member can support the tile when it cuts the tile is the expanded position, thereby providing better support and helping to prevent the tile from breaking during processing.

DETAILED DESCRIPTION OF THE INVENTION

Figure 1:
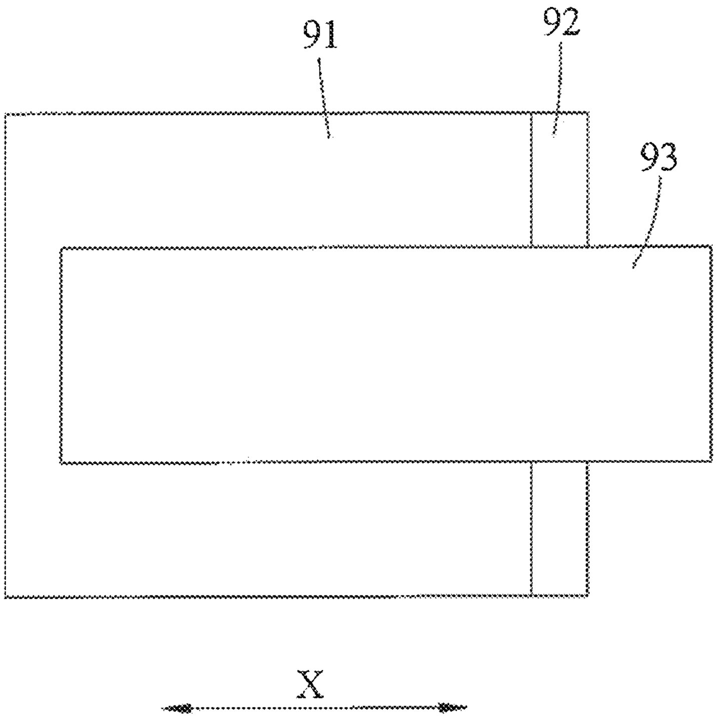
FIG. 1 (PRIOR ART)
FIG. 1 is a schematic structural diagram illustrating that a part of a tile is suspended outside an existing worktable for tile cutter.
Figure 2:
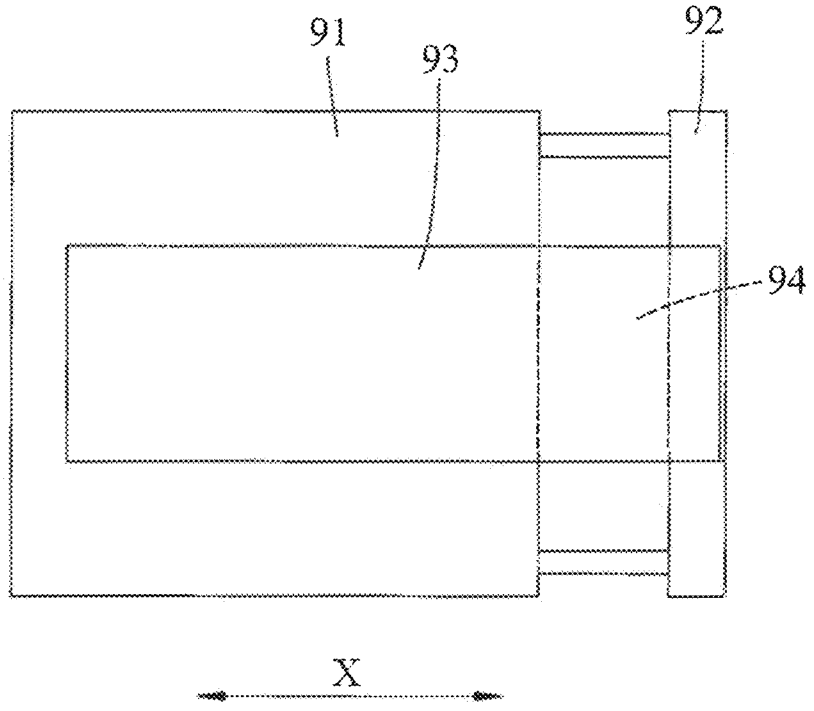
FIG. 2 (PRIOR ART)
FIG. 2 is a schematic structural diagram illustrating that the existing worktable for tile cutter is in an expanded state.
Figure 3:
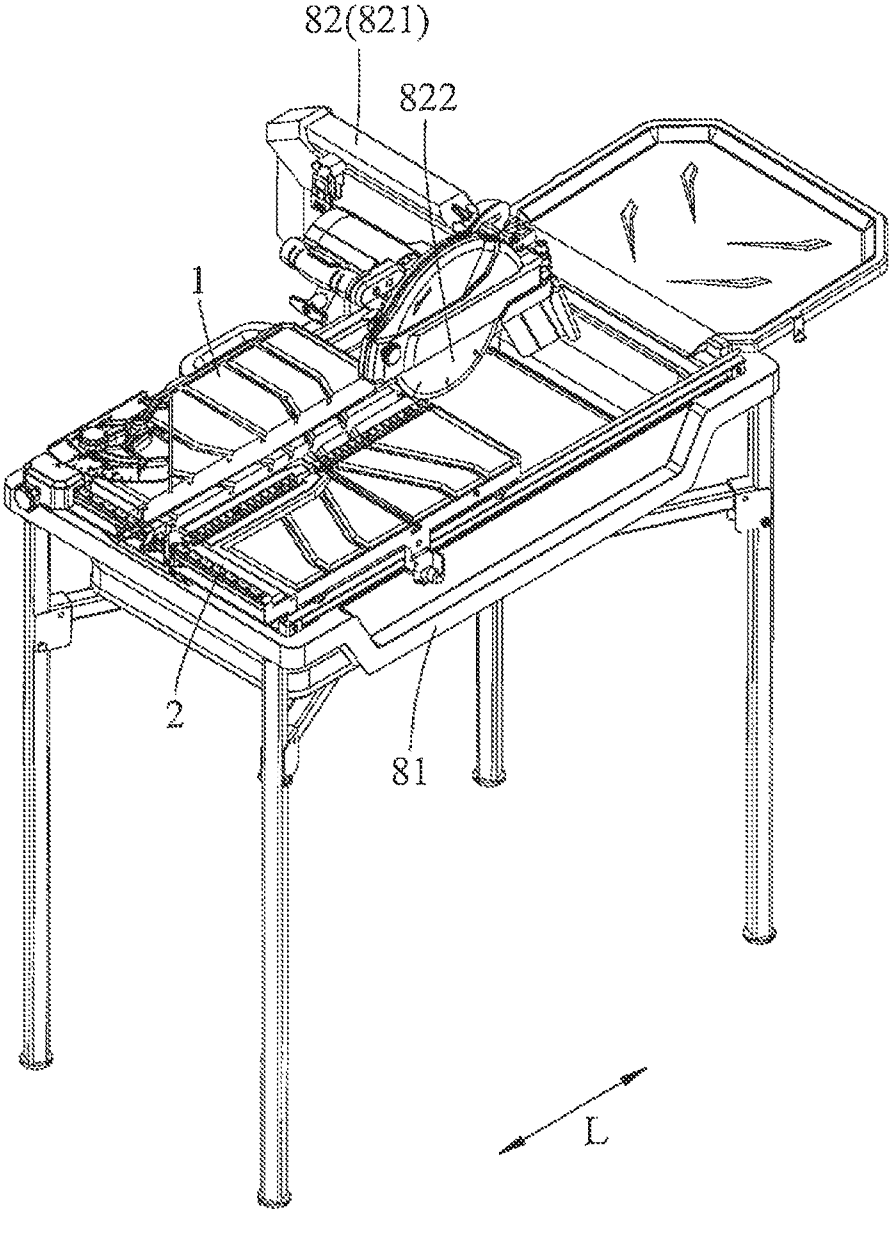
FIG. 3 is an elevational assembly diagram illustrating an embodiment of the worktable assembly for tile cutter of the present invention and a cutting unit set in a base.
Figure 4:
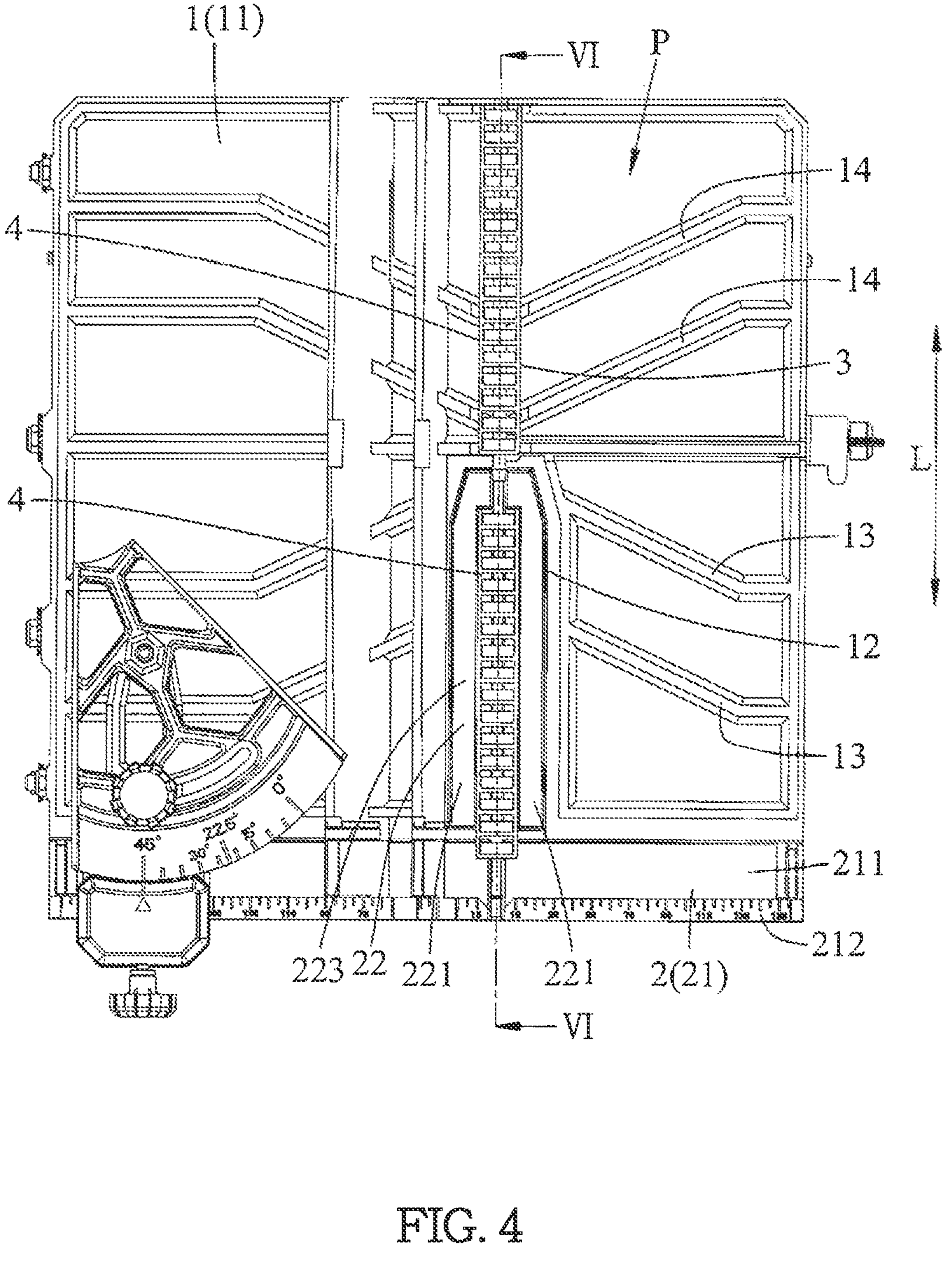
FIG. 4 is a top view illustrating this embodiment in a retracted position.
Figure 5:
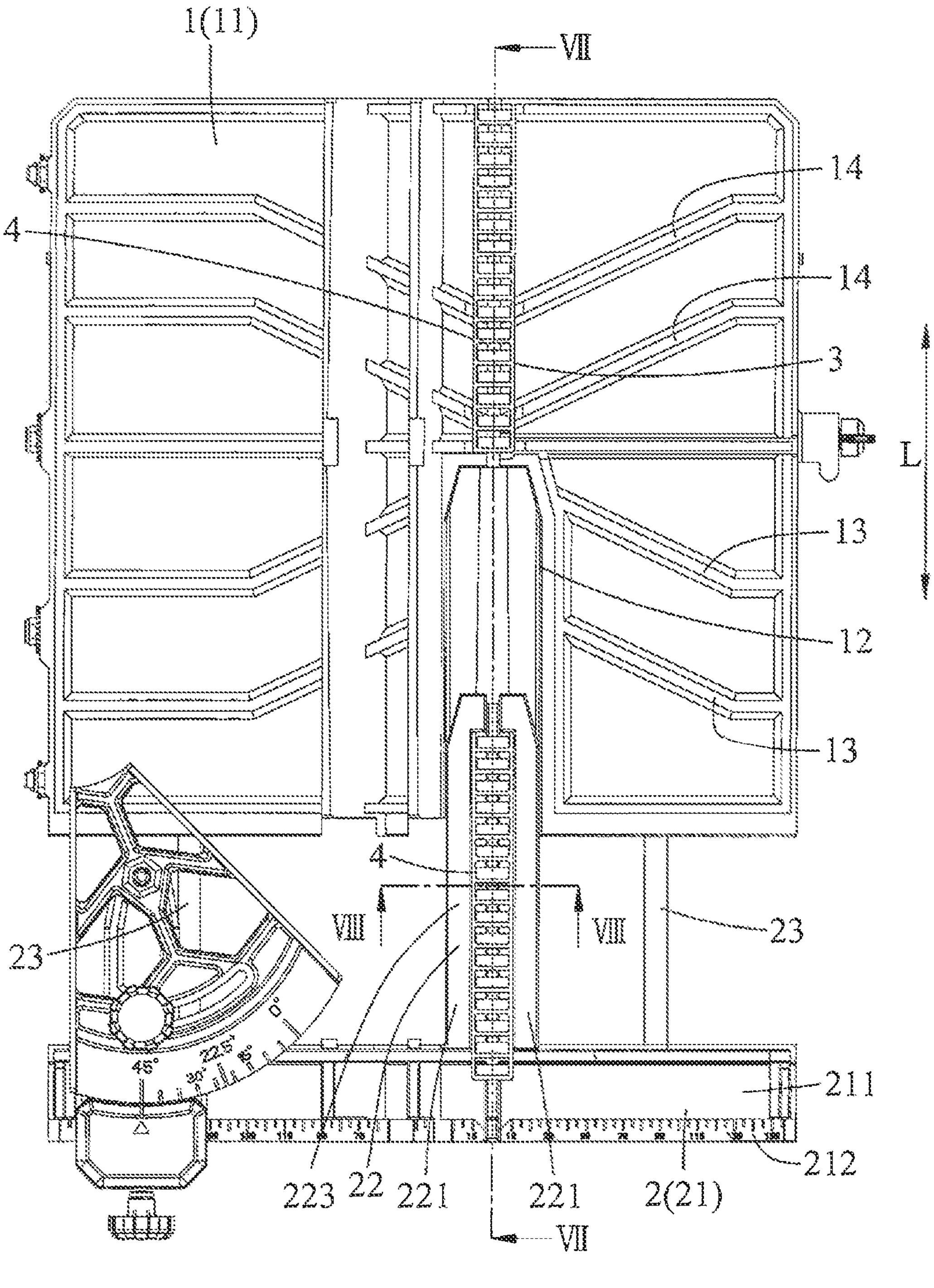
FIG. 5 is a top view illustrating this embodiment in an extended position.
Figure 6:
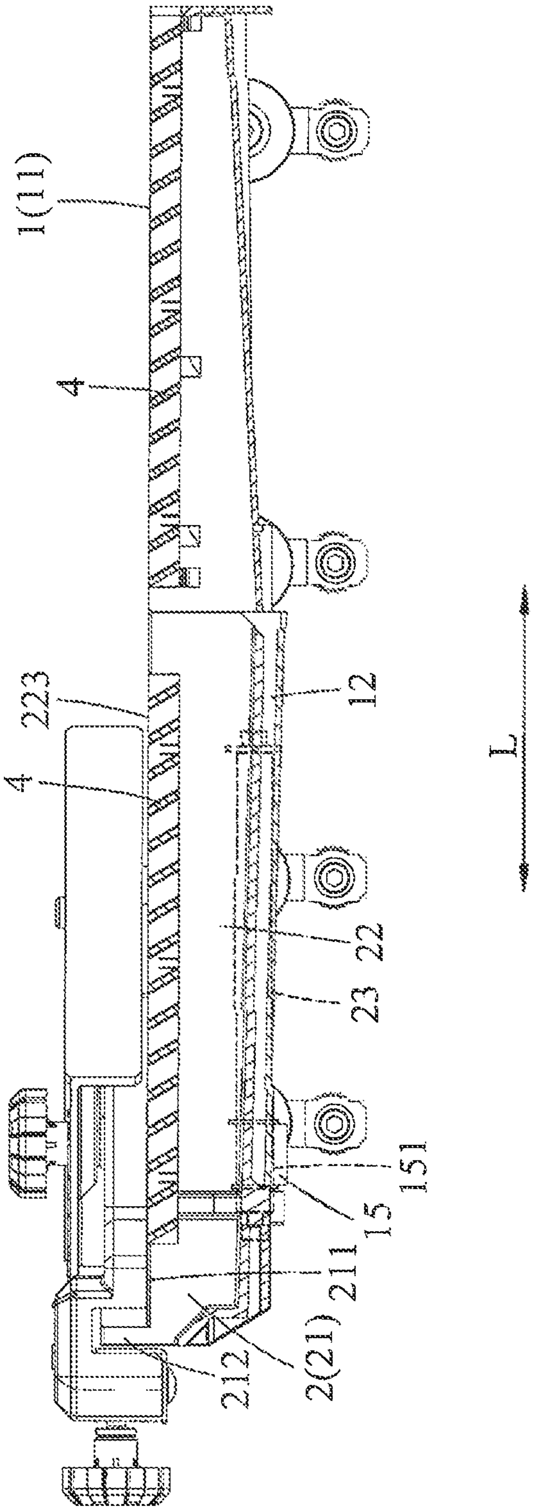
FIG. 6 is a cross-sectional view taken along the line VI in FIG. 4.
Figure 7:
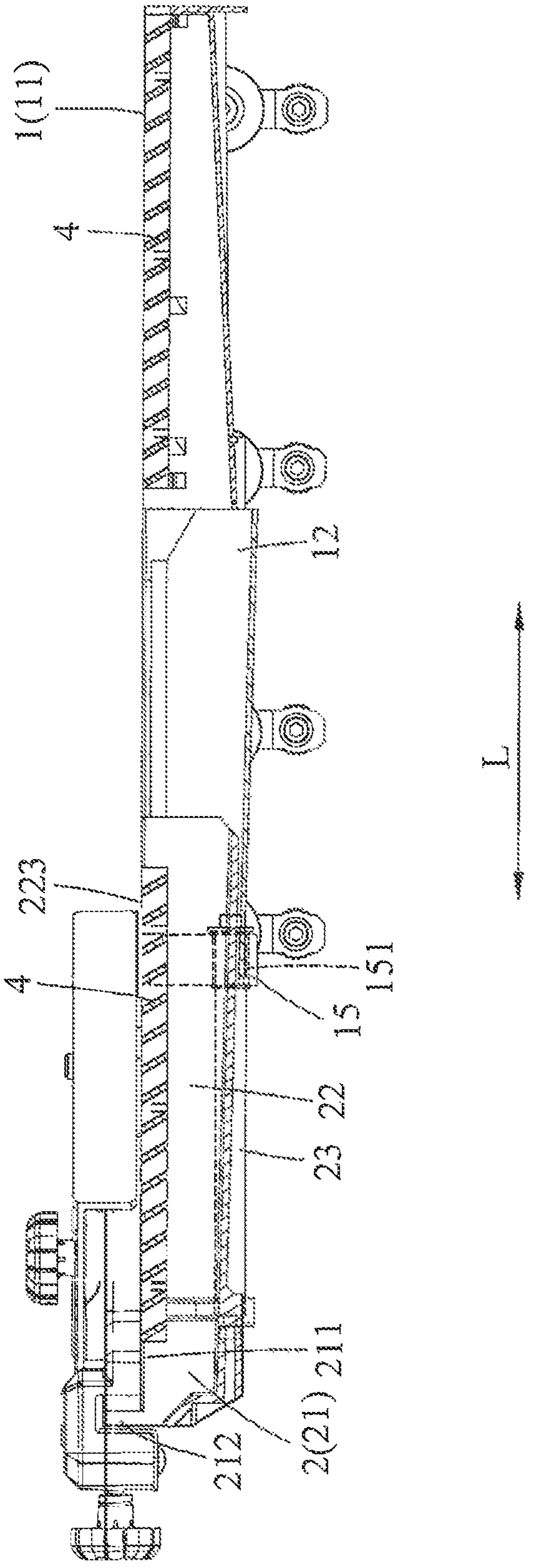
FIG. 7 is a cross-sectional view taken along the line VII in FIG. 5.

Referring to FIG. 3, an embodiment of the worktable assembly for tile cutter of the present invention is suitable for installation in a tile cutter. The tile cutter comprises a base 81 and a cutting unit 82 provided on the base 81. The cutting unit 82 comprises an arm 821 connected to the base 81, and a saw blade 822 rotatably disposed on the arm 821 and spaced from the base 81. The present embodiment is slidably disposed on the base 81 along a processing axis L and can pass between the saw blade 822 and the base 81.

Referring to FIGS. 4-7, this embodiment comprises a first table 1, a second table 2, a cutting channel 3, and two water retaining members 4.

The first table 1 comprises a first surface 11 facing the side where the saw blade 822 is provided, and a slot 12 recessed on the first surface 11, a plurality of first drainage channels 13 recessed on the first surface 11, a plurality of second drainage channels 14 recessed on the first surface 11, and two guiding members 15 arranged on the side opposite to the first surface 11.

The slot 12 extends to the edge along the processing axis L and corresponds to the saw blade 822. The first drainage channels 13 connect the slot 12 to the outside. Each guiding member 15 has a guide hole 151 penetrating along the processing axis L.

Figure 8:
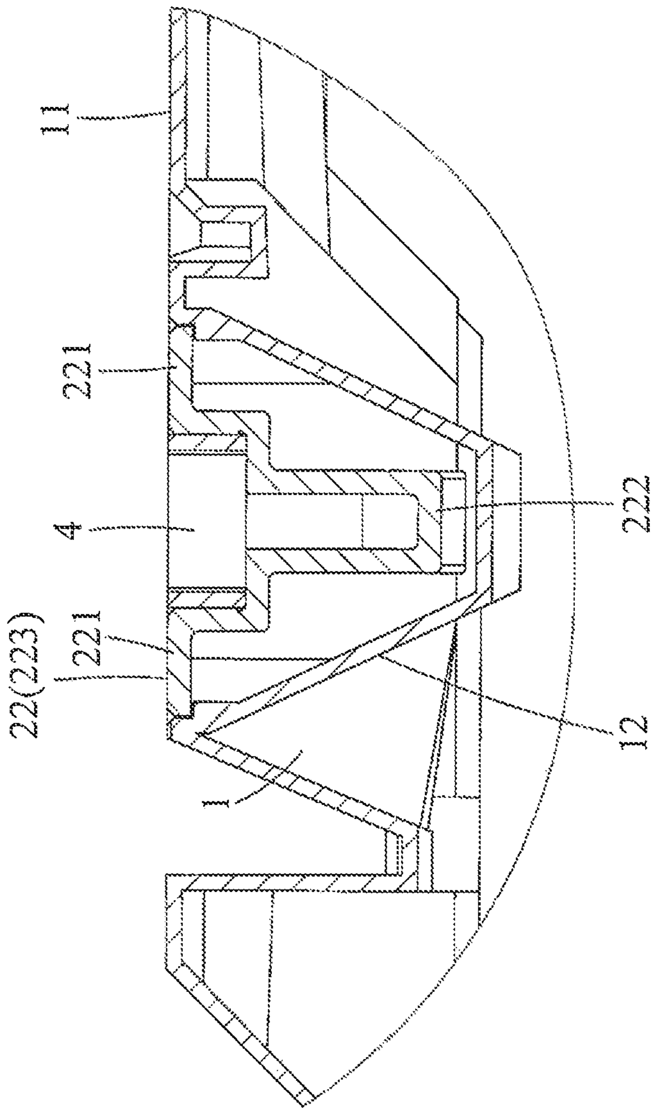
FIG. 8 is a cross-sectional view taken along the line VIII in FIG. 5.

The second table 2 is installed on the first table 1, and comprises a main body 21, an insertion member 22 protruding from the main body 21 along the processing axis L and extending into the slot 12, and two guide rods 23. The main body 21 comprises a second surface 211 facing the side provided with the saw blade 822, and an abutment block 212 protruding from the second surface 211. The insertion member 22 has two supporting portions 221 that abut against the first table 1 and are spaced apart from each other, and a connecting portion 222 (as shown in FIG. 8) connected between the supporting portions 221. The surfaces of the supporting portions 221 adjacent to the side of the saw blade 822 collectively constitute an insertion surface 223 facing the side provided with the saw blade 822. The second surface 211 and the insertion surface 223 are flush with the first surface 11. The guide rods 23 are connected to the main body 21 and are arranged on the side opposite to the insertion surface 223. The guide rods 23 extend along the processing axis L and movably pass through the guide holes 151 respectively, so that the second table 2 can move between a retracted position and an expanded position along the processing axis L relative to the first table 1.

It should be particularly noted that in this embodiment, the guiding members 15 and the guide rods 23 are used to make the second table 2 movable relative to the first table 1. However, this is just an example, and those skilled in the art may also use other technical means to achieve similar functions, which should not limit the present invention.

In the retracted position, the main body 21 is adjacent to the first table 1, and the insertion member 22 is all located in the slot 12. The first surface 11, the insertion surface 223 and the second surface 211 together form a tabletop P. The cutting channel 3 extends along the processing axis L and corresponds to the saw blade 822 and is recessed on the tabletop P. In detail, the cutting channel 3 penetrates the first table 1, the insertion member 22 and the main body 21. In addition, the water retaining members 4 are respectively arranged in the cutting channel 3 corresponding to the part of the first table 1 and the insertion member 22. In this way, when the saw blade 822 of the cutting unit 82 is cooled with water, the water flow will be blocked by the water retaining members 4 and will not splash around. When water flows into the slot 12 or the cutting channel 3, it can also be discharged through the first drainage channels 13 and the second drainage channels 14, so as to prevent the cooling water from overflowing on the tabletop P. In the expanded position, the main body 21 is separated away from the first table 1, and only a small part of the insertion member 22 is located in the slot 12.

It should be particularly emphasized that in this embodiment, the insertion member 22 is all located in the slot 12 when it is in the retracted position. However, in other variations, the insertion member 22 can also be mostly located in the slot 22 instead of all.

In this embodiment, in the expanded position, only a small part of the insertion member 22 is located in the slot 12. However, in other variations, the insertion member 22 can also leave the slot 12. This is just an example and should not be limited to this.

Figure 9:
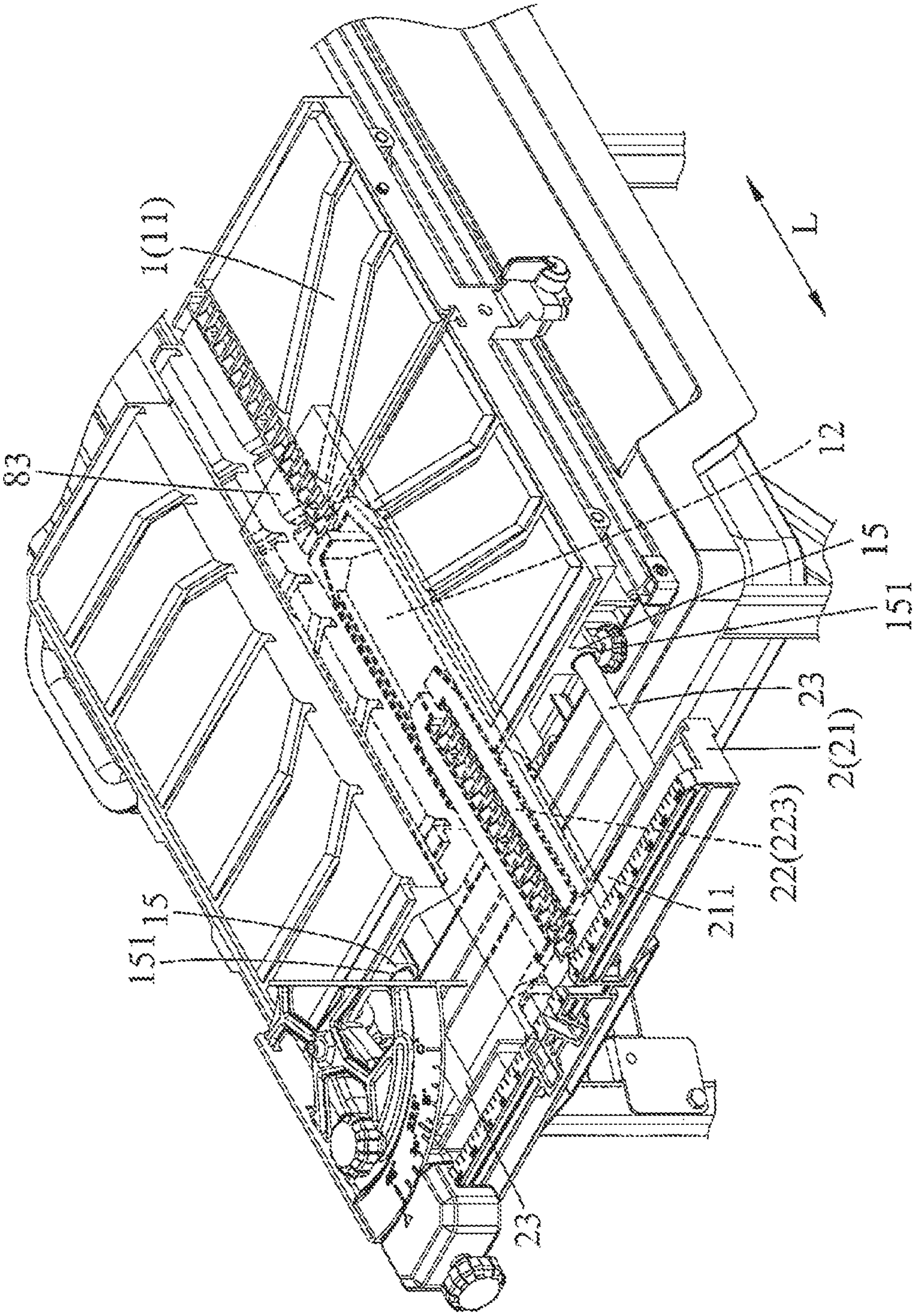
FIG. 9 is a schematic diagram illustrating a tile place in this embodiment in the expanded position.

When operating this embodiment, the tile 83 to be cut is placed on the tabletop P and leaned against the abutment block 212, and tabletop P of this embodiment is pushed between the saw blade 822 and the base 81, so that the tile 83 is cut by the saw blade 822. If the area of the tile 83 is larger or longer, the tabletop P of the present embodiment can be configured to the expanded position, and then the tile 83 to be cut placed on the tabletop P. In this way, when the tile 83 is placed in this embodiment in the expanded position (as shown in FIG. 9), the tile 83 will be simultaneously supported by the first surface 11, the second surface 211 and the insertion surface 223.

Compared with the prior art, no empty area that cannot support the tile 83 will be formed between the first table 1 and the second table 2. Therefore, this embodiment obviously provides better support and helps prevent the tile 83 from breaking during processing.

In summary, the worktable assembly for tile cutter of the present invention, through the cooperation of the slot 12 and the insertion member 22, enables the insertion member 22 to support the tile 83 when cutting the tile 83 in the expanded position, thereby providing better support and helps prevent the tile 83 from breaking during processing. Therefore, it can indeed achieve the purpose of the invention.

However, the above are only examples of the present invention, and should not be used to limit the scope of implementation of the present invention. All simple equivalent changes and modifications made according to the scope of the patent application of the present invention and the content of the patent specification are still within the scope of the patent of the present invention.

What is claimed is:

1. A worktable assembly for use in a tile cutter, said tile cutter comprising a base and a cutting unit provided on said base, said cutting unit comprising an arm connected to said base and a saw blade rotatably disposed on said arm and spaced above said base, the worktable assembly slidably being disposed on said base along a processing axis and capable of passing between said saw blade and said base, the worktable assembly comprising:

a first table comprising a first surface facing a side where said saw blade is provided and a slot recessed on said first surface, said slot extending along said processing axis and corresponding to said saw blade; and a second table installed in said first table, said second table comprising a main body and an insertion member protruding from a side of said main body in a direction of said processing axis and extending into said slot, said insertion member comprising an insertion surface facing a side where said saw blade is provided, said insertion surface being flush with said first surface, said second table being movable between a retracted position and an expanded position along said processing axis relative to said first table, in said retracted position, said main body being adjacent to said first table and most or all of said insertion member being located in said slot, in said expanded position, said main body being separated away from said first table such that only a part or no part of said insertion member is located in said slot.

2. The worktable assembly for use in a tile cutter as claimed in claim 1, wherein in said retracted position, said insertion member is all located in said slot.

3. The worktable assembly for use in a tile cutter as claimed in claim 1, wherein said first table also comprises a plurality of first drainage channels recessed on said first surface and connecting said slot with the outside.

4. The worktable assembly for use in a tile cutter as claimed in claim 1, wherein said main body of said second table comprises a second surface facing the side where said saw blade is provided and an abutment block protruding from said second surface, said second surface being flush with said first surface.

5. The worktable assembly for use in a tile cutter as claimed in claim 4, wherein in said retracted position, said first surface, said insertion surface and said second surface together form a tabletop; the worktable assembly also comprises a cutting channel extending along said processing axis and corresponding to said saw blade and recessed on said tabletop.

6. The worktable assembly for use in a tile cutter as claimed in claim 5, wherein said first table also comprises a plurality of second drainage channels recessed on said first surface and connecting said cutting channel to the outside.

7. The worktable assembly for use in a tile cutter as claimed in claim 5, further comprising two water retaining members set in said cutting channel.

8. The worktable assembly for use in a tile cutter as claimed in claim 1, wherein said first table also comprises two guiding members arranged on the side opposite to said first surface, each said guiding member comprising a guide hole running along said processing axis; said second table also comprises two guide rods connected to said main body and arranged on the side opposite to said insertion surface, said guide rods extending along said processing axis and movably passing through said guide holes respectively, so that said second table is movable between said retracted position and said expanded position relative to said first table along said processing axis.

9. The worktable assembly for use in a tile cutter as claimed in claim 1, wherein said insertion member of said second table comprises two supporting portions abutting on said first table and spaced apart from each other and a connecting portion connected between said supporting portions, said supporting portions collectively defining said insertion surface.

* * * * *